US006208979B1

(12) United States Patent
Sinclair (10) Patent No.: US 6,208,979 B1
(45) Date of Patent: Mar. 27, 2001

(54) COMPUTER-DRIVEN INFORMATION MANAGEMENT SYSTEM FOR SELECTIVELY MATCHING CREDIT APPLICANTS WITH MONEY LENDERS THROUGH A GLOBAL COMMUNICATIONS NETWORK

(75) Inventor: David A. Sinclair, Hickory, NC (US)

(73) Assignee: E-Fin, LLC, Hickory, NC (US)

( * ) Notice: Subject to any disclaimer, the term of this patent is extended or adjusted under 35 U.S.C. 154(b) by 0 days.

(21) Appl. No.: 09/454,095

(22) Filed: Dec. 3, 1999

Related U.S. Application Data (63) Continuation of application No. 09/247,222, filed on Feb. 10, 1999
(60) Provisional application No. 60/107,683, filed on Nov. 9, 1998.

(51) Int. Cl.[7] .................................................. G06F 17/60
(52) U.S. Cl. ............................................. 705/38; 705/1
(58) Field of Search .................................. 705/36, 37, 38

(56) References Cited

U.S. PATENT DOCUMENTS

| | | |
|---|---|---|
| 4,736,294 | 4/1988 | Gill et al. . |
| 5,239,462 | 8/1993 | Jones et al. . |
| 5,611,052 | 3/1997 | Dykstra et al. . |
| 5,774,883 * | 6/1998 | Anderson et al. ................ 705/38 |
| 5,797,133 | 8/1998 | Jones et al. . |
| 5,867,799 * | 2/1999 | Lang et al. ........................ 707/1 |
| 5,870,721 | 2/1999 | Norris . |
| 5,878,403 * | 3/1999 | DeFrancesco et al. .......... 705/38 |
| 5,930,776 | 7/1999 | Dykstra et al. . |
| 5,940,811 | 8/1999 | Norris . |
| 5,940,812 * | 8/1999 | Tengel et al. .................... 705/38 |

FOREIGN PATENT DOCUMENTS 0629 962   12/1994   (EP) .

OTHER PUBLICATIONS

Department Store Reconfigures Credit Decision Process, Credit Rish Management Report, vol. 2, No. 20, Sep. 28, 1992.*
Michaelson, Elizabeth, "Outsource Financial Chooses CMSI", National Mortgage News, vol. 22, No. 39, Jun. 22, 1998, p. 39.*
Moyer, Liz, "Due Soon from Wells Fargo; 10–Minute Car Loans", American Banker, vol. 161, No. 126, Jul. 2, 1996, p. 16.*
"CMSI and HNC, Inc. Provide Credit Processing System", Bank Marketing, Aug. 1993, p. 45.*
Clark, Drew; "Royal Bank to Emphasize Indirect Auto Lending"; American Banker; vol. 163; No. 185; Sep. 28, 1998; p. 17.

* cited by examiner

Primary Examiner—James P. Trammell
Assistant Examiner—Richard W. Hess
(74) Attorney, Agent, or Firm—Adams, Schwartz & Evans, P.A.

(57) ABSTRACT

A computer-driven information management system selectively matches credit applicants with money lenders through a global communications network. The system includes an applicant data entry device for entering applicant data into the system. The applicant data defines an electronic applicant profile of a credit applicant seeking financing. A model data entry device is provided for entering model data into the system. The model data is established by the lender and defines an electronic model profile representing characteristics of a desired applicant. A filter electronically compares the applicant profile with the model profile, such that for those credit applicants matching the model profile, the applicant data is made available through the system to lender. For those credit applicants not matching the model profile, no applicant data is made available through the system to the lender.

42 Claims, 2 Drawing Sheets

COMPUTER-DRIVEN INFORMATION MANAGEMENT SYSTEM FOR SELECTIVELY MATCHING CREDIT APPLICANTS WITH MONEY LENDERS THROUGH A GLOBAL COMMUNICATIONS NETWORK

This application is a continuation application of U.S. Ser. No. 09/247,222 filed on Feb. 10, 1999, which claims the priority filing date of U.S. Provisional Patent Application Ser. No. 60/107,683 filed on Nov. 9, 1998.

TECHNICAL FIELD AND BACKGROUND OF THE INVENTION

The complete disclosure of this application is incorporated herein by reference. This invention relates to a computer-driven information management system for selectively matching credit applicants with money lenders through a global communications network. The system provides a criteria-based, user programmable consumer credit information distribution and reception tool with automated finance product response option capabilities.

For years, consumers have been invited by sellers and finance institutions to apply for credit (including loans and leases) in order to purchase consumer durable goods such as houses, vehicles, boats, large appliances, and the like. To obtain financing for such purchases, the consumer would fill out a credit application which would include personal information relevant to its identity and creditworthiness. This information was then distributed in some manner to a finance institution in the business of writing terms for loan or lease "products." The finance institution would research the creditworthiness of the individual using various resources and respond by phone or fax to the applicant with an "approval," pending documentation and other due diligence, or a "denial" of the application.

For purposes of this description, when a consumer sends information directly to a particular finance institution, the consumer is applying for "direct financing." When an intermediary of any sort, such as a seller of the desired goods, is used to gather and distribute applicant information to one or more finance institutions, the term "indirect financing" is used.

Indirect financing is valuable to finance institutions, sellers, and consumers alike. Finance institutions benefit from the arrangement in that they can capitalize on the "front line" presence of sellers to generate applicants for their finance products. Sellers have benefitted in two ways: one, their customer is able to obtain funds to buy their goods; and two, the finance institution will often reward the seller for sending them a new customer. The consumers benefit by obtaining financing for something they desire on terms acceptable to them.

The traditional avenues of indirect financing suffer from drawbacks and limitations. Prior to the invention, indirect financing was generally time consuming and costly, and was generally limited to an individual seller's access to finance product resources, and its skill and effort made in finding available finance products suitable for the customer. Moreover, depending on consumer credit quality, most credit applications that a finance institution receives through indirect channels do not result in a favorable outcome for anyone and yet, based on applicable Federal regulations, finance institutions are legally required to process and either approve or deny all credit applications received. For denied credit applications, the finance institution must prepare and forward a letter to the applicant stating that the application was denied. This procedure is costly and time consuming. It is also expensive for finance institutions to develop and maintain relationships with indirect channels.

One advantage of the present invention is the creation of an automated process for applicant information distribution by indirect channels, and selective reception of this information by finance institutions. Using the data processing and transmission components of the invention, requested applicant information is keyed into the system by a seller who then creates a potential distribution pattern for this information to finance institutions having access to the system. In addition to the information entered directly by the seller, the system automatically adds certain credit history information obtained through a credit bureau to create a unique electronic profile of the applicant.

Finance institutions can access the system at any time from a different data entry port. To avoid spending time and effort viewing all applicant profiles submitted to it through the system, the finance institution creates a model profile that outlines the characteristics of a desired credit applicant. The system then compares applicant profiles with the model profile of the finance institution and acts as a filter to remove from view information of any applicant that falls outside the profiled parameters.

As the system receives applicant information, it checks the information for potential distribution to any finance institution having access to the system. The system constantly monitors which finance institutions are logged-in and which applicant profiles need to be distributed where. As indicated above, an applicant profile is submitted to a finance institution if the finance institution is among the seller's selected distribution pattern and the applicant profile has characteristics consistent with the finance institution's model profile.

Once a finance institution is selected for receiving a desired applicant profile, it has several options. As one option, the system allows the finance institution to automatically present the seller with a profile-specific finance product based on just the fact that the applicant profile matched its model profile. As another option, the system allows the finance institution to view the electronic profile of the applicant, but without any personal information and no credit bureau information. This abbreviated applicant profile does not constitute a "credit application" and thus, no formal approval or denial is required by the finance institution. With this option, the finance institution can have a real person more finely determine the desirability of any given applicant. Even though the model profile will rule out many applicants as undesirable, finance institutions often have human judgment factors built into their approval processes. If the human factor deems the credit applicant unacceptable, the finance institution can simply remove the applicant's profile from their view and conduct no further processing. As yet another option, the finance institution can choose to automatically download all data from any applicant profile that meets its model profile. In this case, the finance institution legally receives a credit application and must respond to the consumer in writing with either a formal approval or a denial.

According to the present invention, credit applicant information is distributed on the basis of criteria established by both sellers and finance institutions. This is a significant improvement over traditional distribution systems controlled only by sellers. With traditional systems, it is not uncommon for sellers to "broadcast fax" every credit application to every finance institution with whom they have a relationship. Since a faxed credit application landing in a fax basket constitutes "receipt" of the application, the finance institution is required to not only decipher a generally hand-written faxed document, it must also key the information from the document into its own proprietary system, purchase a credit bureau, and then decide whether to approve or deny the application. The finance institution has no option but to do all of this once the application lands in its fax basket. As each finance institution has a varying appetite for different levels of creditworthiness, much time and effort is spent teaching sellers what type of credit applications are deemed desirable. With the present invention, this effort is unnecessary and significant processing costs are avoided.

SUMMARY OF THE INVENTION

Therefore, it is an object of the invention to provide an information management system for fiance institutions and credit applicants which allows finance institutions to custom-form an electronic profile of a model applicant for a given finance product, and to limit financing consideration to only those credit applicants who match the model profile.

It is another object of the invention to provide an information management system for finance institutions and credit applicants which allows sellers and credit applicants to select a potential distribution pattern for applicant information to finance institutions.

It is another object of the invention to provide an information management system for finance institutions and credit applicants which allows faster access to more credit applicant information than that of traditional systems.

It is another object of the invention to provide an information management system for finance institutions and credit applicants which allows electronic delivery of transaction data, thereby reducing data delivery costs.

It is another object of the invention to provide an information management system for finance institutions and credit applicants which affords complete confidentiality for products offered by finance institutions.

It is another object of the invention to provide an information management system for finance institutions and credit applicants which allows finance institutions to quickly adjust a product's rate structure and other product features.

It is another object of the invention to provide an information management system for finance institutions and credit applicants which provides low cost entry by finance institutions into vast markets outside of their geographic "footprint."

It is another object of the invention to provide an information management system for finance institutions and credit applicants which provides low cost new account origination for finance institutions.

It is another object of the invention to provide an information management system for finance institutions and credit applicants which provides state of the art data security.

It is another object of the invention to provide an information management system for finance institutions and credit applicants which provides bulletin board service for finance institutions for a direct marketing channel to sellers.

It is another object of the invention to provide an information management system for finance institutions and credit applicants which operates on a global network through the Internet.

It is another object of the invention to provide an information management system for finance institutions and credit applicants which uses a three-tier application program.

It is another object of the invention to provide an information management system for finance institutions and credit applicants which includes individual tier-one computer workstations.

It is another object of the invention to provide an information management system for finance institutions and credit applicants which uses tier-two business logic located on a wide-area network.

It is another object of the invention to provide an information management system for finance institutions and credit applicants which uses a tier-three database, such as that of a credit bureau, and suitable programing for managing read and write access to the database.

It is another object of the invention to provide an information management system for finance institutions and credit applicants which may be extensible through the use of, but not limited to, the following languages or tools: Cold Fusion, HTML, JavaScript, C++, JAVA, Cobalt, CICS, SQL, and various procedural and object-oriented programming languages.

It is another object of the invention to provide an information management system for finance institutions and credit applicants which uses a client/server network computing model.

These and other objects of the present invention are achieved in the preferred embodiments disclosed below by providing a computer-driven information management system for selectively matching credit applicants with money lenders through a global communications network. The system includes applicant data entry means for entering applicant data into the system. The applicant data defines an electronic applicant profile of a credit applicant seeking financing. Model data entry means are provided for entering model data into the system. The model data is established by the lender and defines an electronic model profile representing characteristics of a desired applicant. Filter means electronically compares the applicant profile with the model profile, such that for those credit applicants matching the model profile, the applicant data is made available through the system to lender. For those credit applicants not matching the model profile, no applicant data is made available through the system to the lender.

According to one preferred embodiment of the invention, the applicant data entry means includes a computer, a keyboard for entering the applicant data into the computer, and global communications means for communicating the applicant data to the system.

According to another preferred embodiment of the invention, the model data entry means includes a computer, a keyboard for entering the model data into the computer, and global communications means for communicating the model data to the system.

According to yet another preferred embodiment of the invention, means are provided for retrieving applicant credit information from a credit bureau and incorporating the credit information into the applicant profile.

According to yet another preferred embodiment of the invention, term notification means are provided for electronically notifying those credit applicants matching the model profile of financing terms set by the lender.

According to yet another preferred embodiment of the invention, the term notification means occurs automatically in response to an applicant matching the model profile.

According to yet another preferred embodiment of the invention, applicant profile distribution means are provided for simultaneously distributing the applicant profile to a number of lenders having access to the system.

According to yet another preferred embodiment of the invention, lender selection means are provided for restricting the distribution of the applicant profile to only those lenders selected by the credit applicant and having access to the system.

According to yet another preferred embodiment of the invention, applicant data storing means are provided for electronically storing applicant data received by the lender through the system.

According to yet another preferred embodiment of the invention, finance product selection means are provided for selecting a desired finance product from a group of finance products communicated to the system by the lenders.

The present invention further comprises a method for electronically managing information distribution to credit applicants and money lenders through a global communications network. The method includes the steps of entering applicant data and model data into the system. The applicant data defines an electronic applicant profile of a credit applicant seeking financing. The model data is established by the lender and defines an electronic model profile representing characteristics of a desired applicant. The applicant profile is then electronically compared with the model profile, such that for those credit applicants matching the model profile, the applicant data is made available through the system to lender. For those credit applicants not matching the model profile, no applicant data is made available through the system to the lender.

According to one preferred embodiment of the invention, the applicant data entry step includes using a computer, a keyboard for entering the applicant data into the computer, and global communications means for communicating the applicant data to the system.

According to another preferred embodiment of the invention, the model data entry step includes using a computer, a keyboard for entering the model data into the computer, and global communications means for communicating the model data to the system.

According to yet another preferred embodiment of the invention, the method includes the step of retrieving applicant credit information from a credit bureau and incorporating the credit information into the applicant profile.

According to yet another preferred embodiment of the invention, the method includes the step of electronically notifying those credit applicants matching the model profile of financing terms set by the lender.

According to yet another preferred embodiment of the invention, the term notification step occurs automatically in response to an applicant matching the model profile.

According to yet another preferred embodiment of the invention, the method includes the step of simultaneously distributing the applicant profile to a number of lenders having access to the system.

According to yet another preferred embodiment of the invention, the method includes the step of restricting the distribution of the applicant profile to only those lenders selected by the credit applicant and having access to the system.

According to yet another preferred embodiment of the invention, the method includes the step of electronically storing applicant data received by the lender through the system.

According to yet another preferred embodiment of the invention, the method includes the step of selecting a desired finance product from a group of finance products communicated to the system by the lenders.

BRIEF DESCRIPTION OF THE DRAWING

Some of the objects of the invention have been set forth above. Other objects and advantages of the invention will appear as the description proceeds when taken in conjunction with the following drawing.

DESCRIPTION OF THE PREFERRED EMBODIMENT AND BEST MODE

Figure 1:
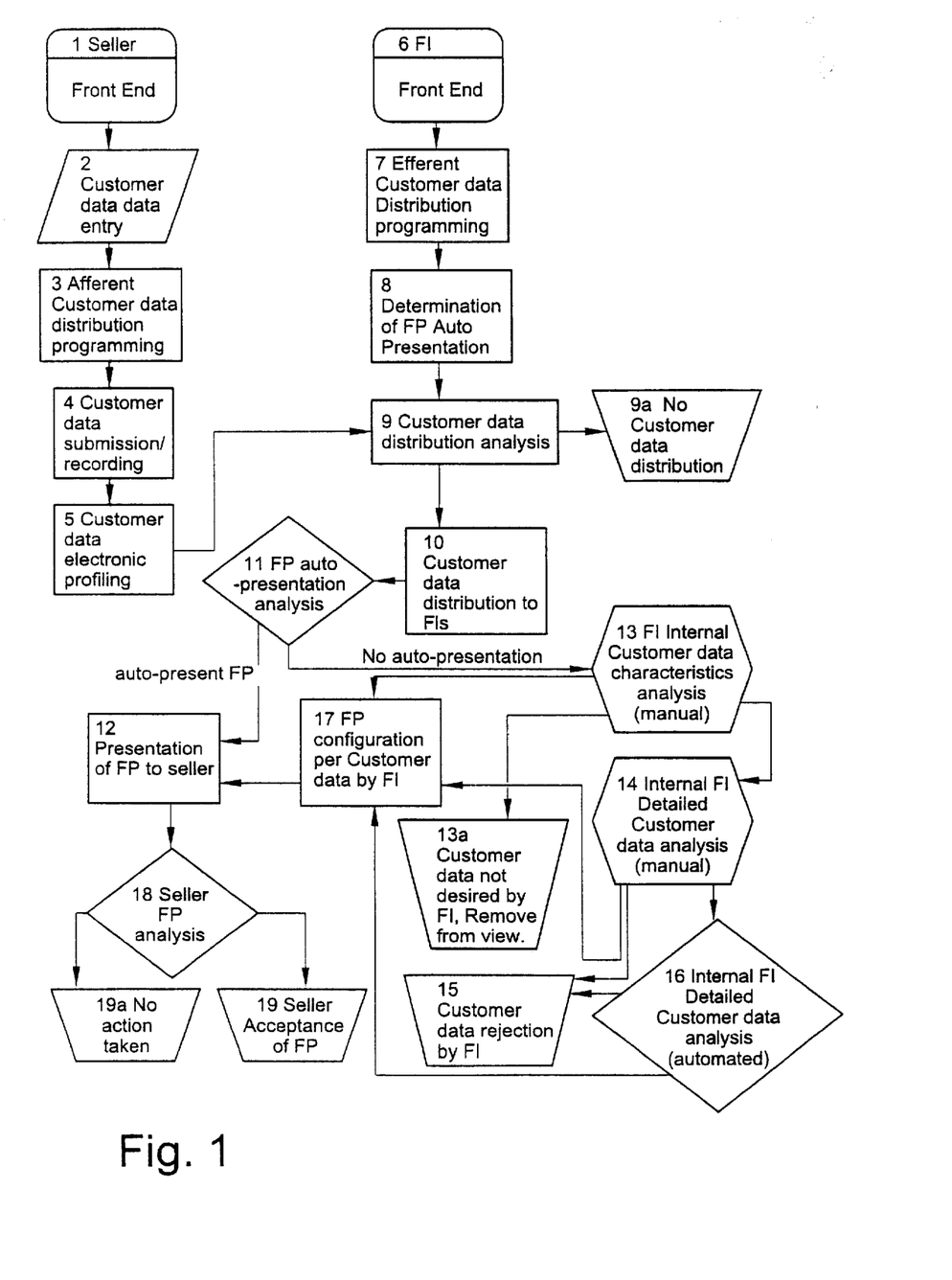
FIG. 1 is a flow chart illustrating one preferred application of the present invention.

Referring now specifically to the drawings, a computer-driven information management system (the "System") according to the present invention is illustrated in flow-diagram form in FIG. 1. The System is a three-tier application system with three primary subsystems or "tools": 1) the afferent distribution programming tool (ADT), 2) the efferent distribution programming tool (EDT), and 3) the automated and non-automated finance product distribution tool (FDT). The term "afferent distribution" as used herein refers to the distribution of credit applicant information inwardly from direct and indirect channels to the finance institutions, or money lenders. The term "efferent distribution" refers to the outward distribution of applications for finance products by finance institutions to sellers and applicants.

Referring to the flow diagram, a general description of the ADT begins with reference to item 1. A description of the EDT begins with reference to item 6. A description of the automated FDT begins with reference to item 11. A description of the non-automated FDT begins with reference to item 13. The following example is of an auto dealer acting as the seller in an indirect financing process.

Afferent Distribution Tool (ADT)

In the present example, a customer at a car dealership desires to purchase a vehicle using indirect financing obtained through the dealership. To access the System, the car dealer, or "seller", requires a standard tier-one computer workstation with suitable hardware and software configured to receive and distribute information through the Internet to a preconstructed system web site. The tier-one programming provides graphical user interface and application-specific entry forms or interactive windows. Other required system hardware includes a keyboard, mouse, monitor, communications equipment such as a modem, and at least one line of communication with all other users and system components. System software includes a suitable Web browser, such as Netscape Navigator or Microsoft's Internet Explorer, for navigating the networked components of the System. In addition, conventional front end I/O tools such as HTML, XTML, JAVA, or other similar network distributable software is used to create various functional screens for end users on a global wide-area network.

Once financing is requested by the customer, the dealer connects to the system web site from his workstation, and navigates within the System to the first of a number of applicant data entry screens. The dealer enters the requested applicant data including personal, financial, and automobile information. See items 1 and 2 of the flow diagram. When this is completed, tier-two system logic prompts the dealer to select (by mouse-clicking) finance institutions who would potentially receive the applicant data (item 3). The finance institutions available for selection are those who subscribe to the System and use it as a source for obtaining credit applicant information. The dealer then mouse-clicks the on-screen "submit" button (item 4) and the applicant data is delivered to the System. Preferably, upon receipt of this data, the System automatically contacts a credit bureau and electronically imports certain employment and credit history information of the applicant using suitable tier-three application software. This information is then combined with the data entered by the dealer to create a unique electronic profile of the applicant (item 5). The applicant profile is formed using standard tier-two middleware, such as "Cold Fusion 3.1". Information typically contained in an applicant profile includes the applicant's name, social security number, address, employment information, financing information such as desired monthly payment and amount financed, and automobile information.

Efferent Distribution Tool (EDT)

Referring now to item 6 of the flow diagram, to access the System, each finance institution requires at least one tier-one workstation including a computer, keyboard, mouse, monitor, communications equipment such as a modem, and at least one line of communication with all other users and system components. System software includes a Web browser for navigating the networked components of the System, and conventional front end I/O tools such as HTTM, XTML, JAVA, or other similar network distributable tier-two applications.

The finance institutions create customized electronic model profiles by entering into the System characteristics they judge to be indicative of a "desirable" credit applicant. For example, one finance institution may wish to see all applicant profiles originating from a particular dealer or geographic area, and having a minimum credit score of 650. Another finance institution may wish to see only those applicant profiles for new car financing and with a minimum loan amount of $30,000. Other qualifiers might include the applicant's gross monthly income, state where dealer is located, number of months the applicant has been employed at present job, number of years the applicant has been residing at present address, and the like.

The model profile is inputted into the System at any workstation of the finance institution using front-end user screens created by, for example, HTML, XTML, or JAVA programming language. Once the model profile is completed and submitted (item 7), the System electronically compares all available applicant profiles with the model profile, and filters out those applicant profiles that do not match the model profile. The remaining "desirable" applicant profiles are then made available to the finance institution for further processing. Tier-two middleware, such as "Cold Fusion 3.1" or the like, and tier-three data storage management and access tools are used to create system logic for analysis of each applicant profile to determine its distribution to finance institutions.

For each model profile created by a finance institution, the finance institution has the option of automatically submitting (item 8) through the System a preconfigured finance product to the dealer for those applicant profiles matching the model profile. This option is selected by the finance institution at the workstation using tier-one system programming.

Referring to items 9, 9a, and 10, as the System compares and matches applicant profiles and model profiles of finance institutions, automated global network data transmission and formatting tools are used to electronically distribute the applicant profiles to the proper finance institutions. Upon receipt, the finance institution immediately sees at its workstation, a representation of each applicant profile having characteristics matching its model profile and the dealer's distribution pattern. The finance institution does not, however, see a complete applicant profile. Instead, only selected applicant data and credit bureau information is distributed to the finance institution for preliminary consideration. Since certain personal information is omitted from this initial distribution, the finance institution has not legally received a "credit application." As a result, the System allows the finance institution to further analyze the desirability of credit applicants and make preliminary determinations of creditworthiness prior to undertaking costly credit application processing.

Automated Finance Product Distribution Tool (FDT)

If the finance institution has elected to automatically distribute a preconfigured finance product application to the dealer in the event of a successful match, as discussed above, the System immediately presents a portion of the finance product to the front end screen of the dealer's workstation. See items 11 and 12. The dealer sees only a limited amount of information such as rate, term, monthly payment, amount of financing and the finance institution behind the product. If this information is agreeable to the dealer and applicant (item 18), the details of the finance product, such as its stipulations, terms, and conditions, are available by simple "drill down" operations which the dealer can do very quickly from its workstation.

Non-automated Finance Product Distribution Tool (FDT)

Referring to items 13–17, if the finance institution has elected not to automatically distribute a finance product application through the System, further applicant profile analysis is generally undertaken manually (item 13) by persons responsible for making "human judgment" determinations of credit applicant desirability. Preferably, to avoid application processing costs and effort, the finance institution views only a portion of the applicant profile at this point. No personal data contained in the profile is made available unless requested. Thus, if the applicant profile is found to be undesirable (item 13a), it is removed from view at the workstation of the finance institution and no formal notification of an application "denial" is required.

For a more detailed manual analysis (item 14), the finance institution may elect to view a complete applicant profile including all acquired personal data of the credit applicant. In this case, by law, the finance institution has now received an application for credit and must formally respond to the applicant with an approval of credit or a rejection letter explaining why the application was denied (item 15). The finance institution may also download the complete applicant profile, and have data transferred to its own internal automated creditworthiness scoring system. These type systems generally have electronic links to credit bureaus and can make approval or rejection decisions automatically (item 16).

Once a particular applicant is approved by a finance institution for credit, the finance institution configures an appropriate finance product (item 17). Front end screens at the finance institution's workstation present an electronic form for including loan information, such as terms, conditions, rates, amounts, monthly payments, and the like. This form is submitted through the System to the dealer's workstation using suitable tier-two system programming (item 12). The dealer can then compare the finance products of each finance institution for a given customer and determine which suit him and his customer's needs (item 18). To make the desired selection, the dealer mouse-clicks an on-screen "accept" button (item 19). This act signals the finance institution that the dealer has made its selection and will generate and forward the necessary documents to the finance institution to finalize the loan transaction. For any unaccepted finance products, no action is required by the dealer (item 19a).

In addition to the scenario described above, the present System is applicable for direct use by customers seeking financing information from lenders and having a computer workstation with access to the system web site. The terms "money lender" and "finance institution" are used synonymously herein.

Figure 2:
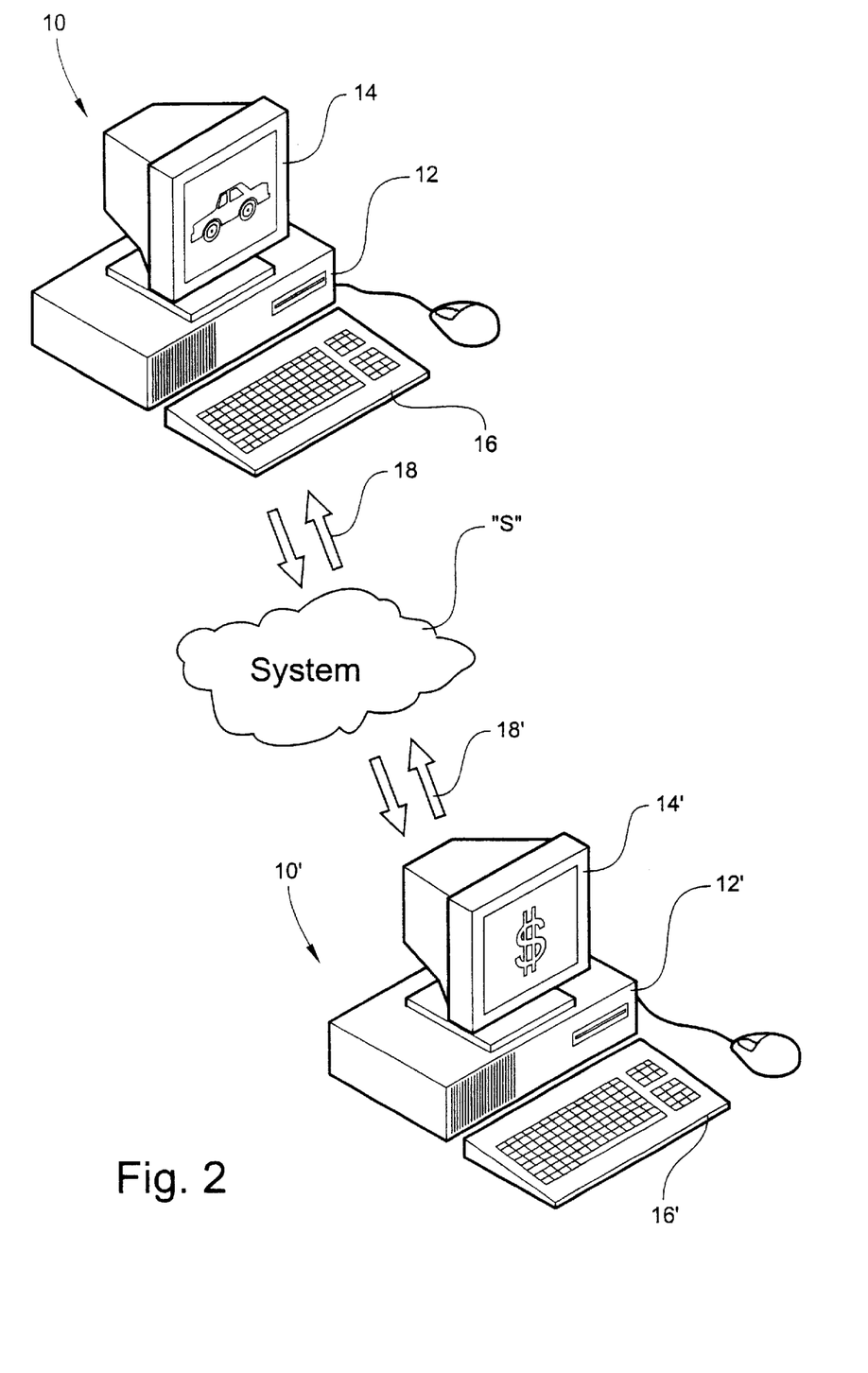
FIG. 2 illustrates tools for enabling communication between the car dealer, finance institution, and system web site via the Internet.

FIG. 2 illustrates data input/output tools applicable to the System for enabling communication between the car dealer, finance institution, and system web site "S" via the Internet. As previously described, in one application, the workstations 10 and 10' of the dealer and finance institution include a computer 12, 12', monitor 14, 14', keyboard 16, 16', and modem connection 18, 18'.

A computer-driven information management system for selectively matching credit applicants with money lenders through a global communications network is described above. Various details of the invention may be changed without departing from its scope. Furthermore, the foregoing description of the preferred embodiment of the invention and the best mode for practicing the invention are provided for the purpose of illustration only and not for the purpose of limitation.

I claim:

1. A computer system for matching, through a global communications network, an applicant for financing for a vehicle acquisition, with a number of financial institutions providing vehicle financing, the computer system comprising:

means for entering applicant data into the system, and for defining a digital applicant profile for the applicant;

means for entering model data into the system, model data being specified by each financial institution, and defining a digital model profile representing characteristics desired by each financial institution for any applicant for financing;

distribution filter means for electronically comparing the digital applicant profile with each digital model profile to filter the distribution of applicant data through the system to the financial institution;

means for, when the applicant profile matches a model profile corresponding to a financial institution, transmitting the applicant profile to the financial institution, through the global communications network;

means for retrieving credit information about the applicant from a credit bureau and incorporating the credit information into the applicant profile;

means for electronically notifying the applicant of financing terms set by a financial institution for the applicant, where the applicant profile matches the model profile specified by that financial institution;

means for simultaneously distributing the applicant profile to a number of further financial institutions, where each such financial institution specified a model profile that matches the applicant profile;

means for further restricting the distribution of the applicant profile only to financial institutions selected by a member of the group comprising the applicant and a vehicle dealer;

means for electronically recording the applicant profile transmitted to any financial institution;

means for selecting by a member of the group comprising the applicant and the institutions;

wherein the means for notifying notifies automatically, if the applicant profile matches a model profile;

wherein the global communications network comprises a first computer with the dealer, and a plurality of other computers with one such other computer at each financial institution, the first computer communicating electronically with each of the other computers through the Internet and a Web site, using a Web browser;

wherein the means for transmitting the applicant profile includes means for transmitting for preliminary consideration part of the data from the applicant profile to the financial institution corresponding to the model profile matching the applicant profile;

wherein the financing is one of a type selected from the group comprising loans and leases;

wherein the applicant profile includes information on a plurality of topics selected from the group comprising personal information, financial information, motor vehicle information, name, social security number, address, employment information, and financing information including desired monthly payment and desire amount to be financed; and wherein each model profile includes information on a plurality of topics selected from the group comprising minimum credit score, type of motor vehicle acceptable, minimum loan amount, minimum gross monthly income of applicant, dealer location, number of months the applicant has been employed at present job, and number of years the applicant has been residing at its present residence.

2. A computer system for matching, through a global communications network, an applicant for financing for a vehicle acquisition, with a financial institution providing vehicle financing, the computer system comprising:

means for entering applicant data into the system, and for defining a digital applicant profile for the applicant;

means for entering model data into the system, model data being specified by the financial institution, and defining a digital model profile representing characteristics desired by each financial institution for any applicant for financing; and distribution filter means for electronically comparing the digital applicant profile with the digital model profile to filter the distribution of applicant data through the system to the final institution;

means for, when the applicant profile matches the model profile corresponding to the financial institution, transmitting the applicant profile to the financial institution, through the global communications network.

3. The computer system of claim 2, wherein the global communications network comprises a first computer with the dealer, and a plurality of other computers with one such other computer at each financial institution, the first computer communicating electronically with each of the other computers through the Internet and a Web site, using a Web browser.

4. The computer system of claim 2, wherein the means for transmitting the applicant profile includes means for transmitting for preliminary consideration part of the data from the applicant profile to the financial institution corresponding to the model profile matching the applicant profile.

5. The computer system of claim 2, wherein the financing is one of a type selected from the group comprising loans and leases.

6. The computer system of claim 2, further comprising means for retrieving credit information about the applicant from a credit bureau and incorporating the credit information into the applicant profile.

7. The computer system of claim 2, further comprising means for electronically notifying the applicant of the financing terms set by each financial institution for the applicant, where the applicant profile matches the model profile specified by that financial institution.

8. The computer system of claim 7, wherein the means for notifying notifies automatically, if the applicant profile matches a model profile.

9. The computer system of claim 2, further comprising means for simultaneously distributing the applicant profile to a number of further financial institutions, where each such financial institution specified a model profile that matches the applicant profile.

10. The computer system of claim 9, further comprising means for further restricting the distribution of the applicant profile only to financial institutions selected by a member of the group comprising the applicant and a vehicle dealer.

11. The computer system of claim 2, further comprising means for electronically recording the applicant profile transmitted to any financial institution.

12. The computer system of claim 2, further comprising means for selecting by a member of the group comprising the applicant and a vehicle dealer, a finance product from a group of finance products specified by the financial institution.

13. The computer system of claim 2, wherein the applicant profile includes information on a plurality of topics selected from the group comprising:

personal information, financial information, motor vehicle information, name, social security number, address, employment information, and financing information including desired monthly payment and desired amount to be financed.

14. The computer system of claim 2, wherein the model profile includes information on a plurality of topics selected from the group comprising:

minimum credit score, type of motor vehicle acceptable, minimum loan amount, minimum gross monthly income of applicant, dealer location, number of months the applicant has been employed at present job, and number of years the applicant has been residing at its present residence.

15. A method executed by a computer system for matching, through a global communications network, an applicant for financing for a vehicle acquisition with a number of financial institutions providing vehicle financing, the method comprising:

entering applicant data into the system, and for defining a digital applicant profile for the applicant;

entering model data into the system, model data being specified by each financial institution, and defining a digital model profile representing characteristics desired by each financial institution for any applicant for financing;

electronically comparing the digital applicant profile with each digital model profile to filter the distribution of applicant data through the system to the financial institution, said comparing comprising:

when the applicant profile matches a model profile corresponding to a financial institution, transmitting the applicant profile to the financial institution, through the global communications network;

retrieving credit information about the applicant from a credit bureau and incorporating the credit information into the applicant profile;

electronically notifying the applicant of financing terms set by a financial institution for the applicant, where the applicant profile matches the model profile specified by that financial institution;

simultaneously distributing the applicant profile to a number of further financial institutions, where each such financial institution specified a model profile that matches the applicant profile;

further restricting the distribution of the applicant profile only to financial institutions selected by a member of the group comprising the applicant and a vehicle dealer;

electronically recording the applicant profile transmitted to any financial institution;

selecting by a member of the group comprising the applicant and the vehicle dealer, a finance product from a group of finance products specified by the financial institutions;

wherein notifying automatically, if the applicant profile matches a model profile;

wherein the global communications network comprises a first computer with the dealer, and a plurality of other computers with one such other computer at each financial institution, the first computer communicating electronically with each of the other computers through the Internet and a Web site, using a Web browser;

wherein transmitting the applicant profile includes transmitting for preliminary consideration part of the data from the applicant profile to the financial institution corresponding to the model profile matching the applicant profile;

wherein the financing is one of a type selected from the group comprising loans and leases;

wherein the applicant profile includes information on a plurality of topics selected from the group comprising personal information, financial information, motor vehicle information, name, social security number, address, employment information, and financing information including desired monthly payment and desired amount to be financed; and wherein each model profile includes information on a plurality of topics selected from the group comprising minimum credit score, type of motor vehicle acceptable, minimum loan amount, minimum gross monthly income of applicant, dealer location, number of months the applicant has been employed at present job, and number of years the applicant has been residing at its present residence.

16. A method executed by a computer system for matching, through a global communications network, an applicant for financing for a vehicle acquisition with a financial institution providing vehicle financing, the method comprising:

entering applicant data into the system, and for defining a digital applicant profile for the applicant;

entering model data into the system, model data being specified by the financial institution, and defining a digital model profile representing characteristics desired by each financial institution for any applicant for financing; and electronically comparing the digital applicant profile with the digital model profile to filter the distribution of applicant data through the system to the financial institution, said comparing comprising:

when the applicant profile matches the model profile corresponding to the financial institution, transmitting the applicant profile to the financial institution, through the global communications network.

17. The method of claim 16, wherein the global communications network comprises a first computer with the dealer, and a plurality of other computers with one such other computer at each financial institution, the first computer communicating electronically with each of the other computers through the Internet and a Web site, using a Web browser.

18. The method of claim 16, wherein transmitting the applicant profile includes transmitting for preliminary consideration part of the data from the applicant profile to the financial institution corresponding to the model profile matching the applicant profile.

19. The method of claim 16, wherein the financing is one of a type selected from the group comprising loans and leases.

20. The method of claim 16, further comprising retrieving credit information about the applicant from a credit bureau and incorporating the credit information into the applicant profile.

21. The method of claim 16, further comprising electronically notifying the applicant of the financing terms set by each financial institution for the applicant, where the applicant profile matches the model profile specified by that financial institution.

22. The method of claim 21, wherein notifying automatically, if the applicant profile matches a model profile.

23. The method of claim 16, further comprising simultaneously distributing the applicant profile to a number of further financial institutions, where each such financial institution specified a model profile that matches the applicant profile.

24. The method of claim 23, further comprising further restricting the distribution of the applicant profile only to financial institutions selected by a member of the group comprising the applicant and a vehicle dealer.

25. The method of claim 16, further comprising electronically recording the applicant profile transmitted to any financial institution.

26. The method of claim 16, further comprising selecting by a member of the group comprising the applicant and a vehicle dealer, a finance product from a group of finance products specified by the financial institution.

27. The method of claim 16, wherein the applicant profile includes information on a plurality of topics selected from the group comprising:

personal information, financial information, motor vehicle information, name, social security number, address, employment information, and financing information including desired monthly payment and desire amount to be financed.

28. The method of claim 16, wherein the model profile includes information on a plurality of topics selected from the group comprising:

minimum credit score, type of motor vehicle acceptable, minimum loan amount, minimum gross monthly income of applicant, dealer location, number of months the applicant has been employed at present job, and number of years the applicant has been residing at its present residence.

29. A computer readable memory medium, encoded with data representing a computer program, that can be used by a computer system to direct the computer system to execute a method for matching, through a global communications network, an applicant for financing for a vehicle acquisition, with a number of financial institutions providing vehicle financing, the medium comprising:

means for entering applicant data into the system, and for defining a digital applicant profile for the applicant;

means for entering model data into the system, model data being specified by each financial institution, and defining a digital model profile representing characteristics desired by each financial institution for any applicant financing;

distribution filter means for electronically comparing the digital applicant profile with each digital model profile to filter the distribution of applicant data through the system to the financial institution;

means for, when the applicant profile matches a model profile corresponding to a financial institution, transmitting the applicant profile to the financial institution, through the global communications network;

means for retrieving credit information about the applicant from a credit bureau and incorporating the credit information into the applicant profile;

means for electronically notifying the applicant of financing terms set by a financial institution for the applicant, where the applicant profile matches the model profile specified by that financial institution;

means for simultaneously distributing the applicant profile to a number of further financial institutions, where each such financial institution specified a model profile that matches the applicant profile;

means for further restricting the distribution of the applicant profile only to financial institutions selected by a member of the group comprising the applicant and a vehicle dealer;

means for electronically recording the applicant profile transmitted to any financial institution;

means for selecting by a member of the group comprising the applicant and the vehicle dealer, a finance product from a group of finance products specified by the financial institutions;

wherein the means for notifying notifies automatically, if the applicant profile matches a model profile;

wherein the global communications network comprises a first computer with the dealer, and a plurality of other computers with one such other computer at each financial institution, the first computer communicating electronically with each of the other computers through the Internet and a Web site, using a Web browser;

wherein the means for transmitting the applicant profile includes means for transmitting for preliminary consideration part of the data from the applicant profile to the financial institution corresponding to the model profile matching the applicant profile;

wherein the financing is one of a type selected from the group comprising loans and leases;

wherein the applicant profile includes information on a plurality of topics selected from the group comprising personal information, financial information, motor vehicle information, name, social security number, address, employment information, and financing information including desired monthly payment and desired amount to be financed; and wherein each model profile includes information on a plurality of topics selected from the group comprising minimum credit score, type of motor vehicle acceptable, minimum loan amount, minimum gross monthly income of applicant, dealer location, number of months the applicant has been employed at present job, and number of years the applicant has been residing at its present residence.

30. A computer readable memory medium, encoded with data representing a computer program, that can be used by a computer system to direct the computer system to execute a method for matching, through a global communications network, an applicant for financing for a vehicle acquisition, with a financial institution providing vehicle financing, the medium comprising:

means for entering applicant data into the system, and for defining a digital applicant profile for the applicant;

means for entering model data into the system, model data being specified by the financial institution, and defining a digital model profile representing characteristics desired by each financial institution for any applicant for financing; and distribution filter means for electronically comparing the digital applicant profile with the digital model profile to filter the distribution of applicant data through the system to the financial institution;

means for, when the applicant profile matches the model profile corresponding to the financial institution, transmitting the applicant profile to the financial institution, through the global communications network.

31. The medium of claim 30, wherein the global communications network comprises a first computer with the dealer, and a plurality of other computers with one such other computer at each financial institution, the first computer communicating electronically with each of the other computers through the Internet and a Web site, using a Web browser.

32. The medium of claim 30, wherein the means for transmitting the applicant profile includes means for transmitting for preliminary consideration part of the data from the applicant profile to the financial institution corresponding to the model profile matching the applicant profile.

33. The medium of claim 30, wherein the financing is one of a type selected from the group comprising loans and leases.

34. The medium of claim 30, further comprising means for retrieving credit information about the applicant from a credit bureau and incorporating the credit information into the applicant profile.

35. The medium of claim 30, further comprising means for electronically notifying the applicant of the financing terms set by each financial institution for the applicant, where the applicant profile matches the model profile specified by that financial institution.

36. The medium of claim 35, wherein the means for notifying notifies automatically, if the applicant profile matches a model profile.

37. The medium of claim 30, further comprising means for simultaneously distributing the applicant profile to a number of further financial institutions, where each such financial institution specified a model profile that matches the applicant profile.

38. The medium of claim 37, further comprising means for further restricting the distribution of the applicant profile only to financial institutions selected by a member of the group comprising the applicant and a vehicle dealer.

39. The medium of claim 30, further comprising means for electronically recording the applicant profile transmitted to any financial institution.

40. The medium of claim 30, further comprising means for selecting by a member of the group comprising the applicant and a vehicle dealer, a finance product from a group of finance products specified by the financial institution.

41. The medium of claim 30, wherein the applicant profile includes information on a plurality of topics selected from the group comprising:

personal information, financial information, motor vehicle information, name social security number, address, employment information, and financing information including desired monthly payment and desired amount to be financed.

42. The medium of claim 30, wherein the model profile includes information on a plurality of topics selected from the group comprising:

minimum credit score, type of motor vehicle acceptable, minimum loan amount, minimum gross monthly income of applicant, dealer location, number of months the applicant has been employed at present job, and number of years the applicant has been residing at its present residence.

* * * * *

UNITED STATES PATENT AND TRADEMARK OFFICE
CERTIFICATE OF CORRECTION

PATENT NO. : 6,208,979 B1
DATED : March 27, 2001
INVENTOR(S) : Sinclair, David A.

Page 1 of 1

It is certified that error appears in the above-identified patent and that said Letters Patent is hereby corrected as shown below:

<u>Claim 2,</u>
Line 53, the word "final" should be -- financial --.

Signed and Sealed this

Ninth Day of April, 2002

Attest:

Attesting Officer

JAMES E. ROGAN
Director of the United States Patent and Trademark Office